United States Patent
Oka

(10) Patent No.: US 11,254,308 B2
(45) Date of Patent: Feb. 22, 2022

(54) LANE DEPARTURE AVOIDANCE SYSTEM

(71) Applicant: DENSO CORPORATION, Kariya (JP)

(72) Inventor: Kazumichi Oka, Kariya (JP)

(73) Assignee: DENSO CORPORATION, Kariya (JP)

( * ) Notice: Subject to any disclaimer, the term of this patent is extended or adjusted under 35 U.S.C. 154(b) by 652 days.

(21) Appl. No.: 16/086,476

(22) PCT Filed: Mar. 7, 2017

(86) PCT No.: PCT/JP2017/008998
§ 371 (c)(1),
(2) Date: Sep. 19, 2018

(87) PCT Pub. No.: WO2017/163856
PCT Pub. Date: Sep. 28, 2017

(65) Prior Publication Data
US 2019/0092325 A1    Mar. 28, 2019

(30) Foreign Application Priority Data

Mar. 22, 2016 (JP) .............................. JP2016-057506

(51) Int. Cl.
*B60W 30/12* (2020.01)
*B62D 15/02* (2006.01)
*G06K 9/00* (2006.01)
*G08G 1/16* (2006.01)
*B60R 21/00* (2006.01)

(52) U.S. Cl.
CPC ............. *B60W 30/12* (2013.01); *B60R 21/00* (2013.01); *B62D 15/025* (2013.01); *G06K 9/00798* (2013.01); *G08G 1/16* (2013.01)

(58) Field of Classification Search
CPC ...... B60W 30/12; B60R 21/00; B62D 15/025; G06K 9/00798
See application file for complete search history.

(56) References Cited

U.S. PATENT DOCUMENTS

2014/0111369 A1    4/2014  Oh et al.

FOREIGN PATENT DOCUMENTS

| EP | 2012211 A1 | * | 1/2009 | ............. G08G 1/167 |
| EP | 2012211 A1 |  | 1/2009 | |
| JP | H08-16998 |  | 1/1996 | |
| JP | 11139335 A | * | 5/1999 | |
| JP | H11-139335 A |  | 5/1999 | |

(Continued)

*Primary Examiner* — Charles J Han
(74) *Attorney, Agent, or Firm* — Maschoff Brennan

(57) ABSTRACT

A lane departure avoidance system includes: a recognition unit that recognizes a road edge of the road, and recognizes an outer line as a dividing line drawn on a road-edge side of a lane closest to the road edge; and an assist implementation unit that provides, within an area including the lane closest to the road edge and extending to the road edge, a forbidden position over which a vehicle is forbidden from going toward the road edge, and implements traveling assistance such that the vehicle does not go over the forbidden position. The system includes a shoulder width calculation unit that calculates, as a shoulder width, a width from the outer line to the road edge. The wider the shoulder width calculated by the shoulder width calculation unit is, the closer the forbidden position is set to the road edge by the assist implementation unit.

7 Claims, 2 Drawing Sheets

(56) References Cited

FOREIGN PATENT DOCUMENTS

| | | |
|---|---|---|
| JP | 2004-038641 | 2/2004 |
| JP | 2006-137416 | 6/2006 |
| JP | 2009-274497 A | 11/2009 |
| JP | 2012-003419 | 1/2012 |
| JP | 2014-056484 A | 3/2014 |
| JP | 2014056484 A * | 3/2014 |
| JP | 2014-194698 | 10/2014 |

\* cited by examiner

LANE DEPARTURE AVOIDANCE SYSTEM

CROSS-REFERENCE TO RELATED APPLICATION

The present application is a national stage application under 35 U.S.C. § 371(c) of PCT Application No. PCT/JP2017/008998, filed on Mar. 7, 2017, which claims priority to Japanese Patent Application No. 2016-057506 filed on Mar. 22, 2016, the entire contents of which are incorporated herein by reference.

TECHNICAL FIELD

The present disclosure relates to a lane departure avoidance system for preventing a vehicle from leaving its lane when the vehicle moves in a direction of leaving the lane.

BACKGROUND ART

In recent years, lane departure prevention techniques have been developed for causing a vehicle such as a passenger car to move in a direction preventing the vehicle from crossing either the right dividing line or the left dividing line of its lane. Some of the lane departure prevention techniques include, for example, capturing the view ahead of the vehicle with an imaging device to detect a lane, determining the possibility that the vehicle leaves the lane on the basis of the position of the detected lane and the behavior of the vehicle, and notifying the driver of the possibility of leaving the lane, if any (refer to PTL 1).

In case the vehicle crosses a dividing line (hereinafter referred to as an outer line) adjacent to a shoulder (an emergency stopping lane), PTL 1 provides a second determination line inside the vehicle's lane on the edge of the lane adjacent to the shoulder, and performs an alarm process for the driver in the event that the vehicle crosses the second determination line. The second determination line is provided further inside the lane than a first determination line provided on the edge of the lane which is not adjacent to the median strip or shoulder, so that the alarm process can be promptly performed for the vehicle moving out of the lane into the shoulder.

CITATION LIST

Patent Literature

[PTL 1] JP 2009-274497 A

SUMMARY OF THE INVENTION

However, public roads do not always have a fixed width (hereinafter referred to as a shoulder width) from the outer lines to the actual road surface edges, and some roads have wide shoulder widths whereas others have narrow shoulder widths. Therefore, for example, if a driver moves his/her vehicle on a road with a wide shoulder width in a direction approaching the outer line in consideration of the wide shoulder width, the vehicle based on the technique described in PTL 1 could perform the alarm process for the driver in response to determining that the vehicle has crossed the second determination line. In this case, the alarm process is performed for an intentional movement of the vehicle, causing concern that the driver may feel a sense of discomfort from the performing of the alarm process.

The present disclosure has been made in order to solve the above problems, and the main object thereof is to provide a lane departure avoidance system capable of performing lane departure avoidance appropriately in consideration of a shoulder width.

The present disclosure is a lane departure avoidance system including: an in-vehicle camera that captures an image of a road ahead of a vehicle; a road edge recognition unit that recognizes a road edge of the road from the image captured by the in-vehicle camera; an outer line recognition unit that recognizes, from the image captured by the in-vehicle camera, an outer line as a dividing line drawn on a road-edge side of a lane closest to the road edge; and an assist implementation unit that provides, within an area including the lane closest to the road edge and extending to the road edge, a forbidden position over which the vehicle is forbidden from going toward the road edge, and implements traveling assistance such that the vehicle does not go over the forbidden position. The lane departure avoidance system includes a shoulder width calculation unit that calculates, as a shoulder width, a width from the outer line recognized by the outer line recognition unit to the road edge recognized by the road edge recognition unit. The wider the shoulder width calculated by the shoulder width calculation unit is, the closer the forbidden position is set to the road edge by the assist implementation unit.

Some public roads have wide shoulder widths whereas others have narrow shoulder widths. Suppose, on a road having a wide shoulder width, for example, a driver intentionally drives his/her vehicle toward the outer line in consideration of the wide width of the shoulder. In such a situation, the conventional technique could implement some traveling assistance in response to determining that the vehicle is in danger of crossing the outer line toward the road edge. In this case, traveling assistance is implemented for an intentional movement of the vehicle, causing concern that the driver may feel a sense of discomfort from the implemented traveling assistance. In order to deal with this problem, the lane departure avoidance system includes the shoulder width calculation unit and the assist implementation unit. The assist implementation unit provides, within the area including the lane closest to the road edge and extending to the road edge, the forbidden position over which the vehicle is forbidden from going toward the road edge, and implements traveling assistance such that the vehicle does not go over the forbidden position. At this time, the wider the shoulder width calculated by the shoulder width calculation unit is, the closer the forbidden position is set to the road edge. With such a configuration, the forbidden position on a road with a wide shoulder width is set close to the road edge due to the wide shoulder width. Thus, even when a driver drives his/her vehicle on this road toward the outer line in consideration of the wide width of the shoulder, implementation of traveling assistance which ignores the driver's intention can be prevented.

In addition, the present disclosure is a lane departure avoidance system including: an in-vehicle camera that captures an image of a road ahead of a vehicle; a road edge recognition unit that recognizes a road edge of the road from the image captured by the in-vehicle camera; an outer line recognition unit that recognizes, from the image captured by the in-vehicle camera, an outer line as a dividing line drawn on a road-edge side of a lane closest to the road edge; and an assist implementation unit that provides an assist start position inside the lane, and if the vehicle moves toward the outer line over the assist start position, implements traveling assistance to prevent the vehicle from crossing the outer line toward the road edge. The lane departure avoidance system includes a shoulder width calculation unit that calculates, as a shoulder width, a width from the outer line recognized by the outer line recognition unit to the road edge recognized by the road edge recognition unit. The wider the shoulder width calculated by the shoulder width calculation unit is, the closer the assist start position is set to the outer line by the assist implementation unit.

The assist start position is provided inside the lane. Then, traveling assistance by the assist implementation unit is implemented in the event that the vehicle moves toward the outer line over the provided assist start position. The wider the shoulder width is, the closer the assist start position is set to the outer line. Therefore, if the shoulder width is wide, the timing of starting traveling assistance can be delayed.

BRIEF DESCRIPTION OF DRAWINGS

The above and other objects, characteristics, and advantages of the present disclosure will be further clarified in the following detailed description with reference to the accompanying drawings, in which.

DESCRIPTION OF THE EMBODIMENT

Figure 1:
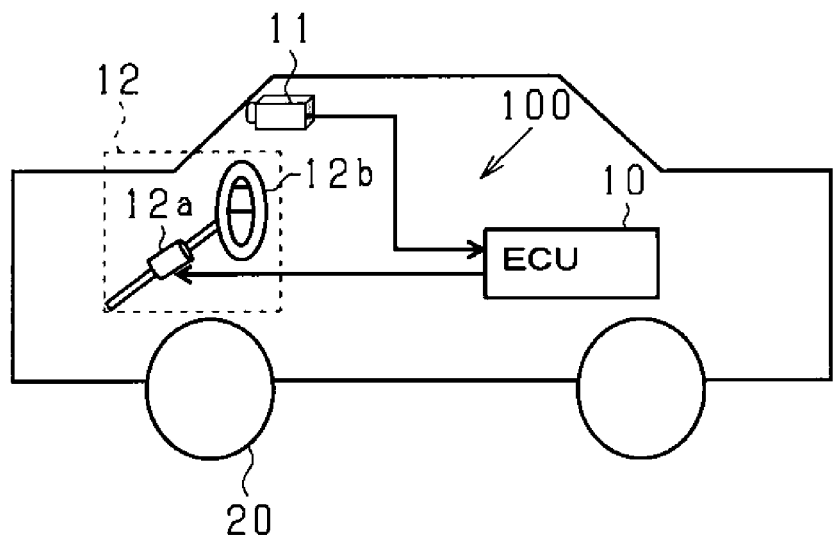
FIG. 1 is a schematic configuration diagram of a traveling assist device according to the present embodiment.

A lane departure avoidance system 100 applied to a vehicle that travels having driving wheels 20 which are driven in a rotational manner will be described with reference to FIG. 1. The lane departure avoidance system 100 includes a detection ECU 10, an imaging device (corresponding to an in-vehicle camera) 11, and an electric power steering 12.

The imaging device 11 includes, for example, a CCD camera, a CMOS image sensor, a near-infrared camera, or the like. In this case, the imaging device 11 is attached to the vehicle at a predetermined height in the width-directional center thereof to capture, from a high perspective, a region extending over a predetermined range of angles in front of the vehicle. The imaging device 11 captures an image of a road ahead of the vehicle, and outputs the captured image to the detection ECU 10. Note that the imaging device 11 may be a monocular camera or a stereo camera.

The imaging device 11 is coupled to the detection ECU 10. The detection ECU 10 is a computer including a CPU, RAM, ROM, I/O interface, and the like. The CPU executes a program installed on the ROM, whereby the detection ECU 10 implements various functions thereof. In the present embodiment, the program installed on the ROM is a control program for detecting, from information in an image captured by the imaging device 11, a white line or the like that defines the vehicle's lane, and for performing a predetermined traveling assist process as necessary on the basis of the relation between information on the position of the detected white line and information on the position of the vehicle. The detection ECU 10 corresponds to a road edge recognition unit, an outer line recognition unit, and a shoulder width calculation unit.

Below is a method of detecting a white line as a dividing line that defines a lane from an image captured by the imaging device 11. On the basis of the luminance of an image captured by the imaging device 11, points of change in the contrast (edge strength) between the white line that defines the lane and the road surface are extracted as edge candidate points. Then, boundary candidate lines are extracted from a series of extracted edge candidate points. More specifically, an image acquired from the imaging device 11 is continuously processed at predetermined sampling intervals, and a plurality of points where the luminance drastically changes is extracted as edge candidate points in the horizontal direction of the image. Then, the Hough transform is performed on the plurality of extracted edge candidate points so that a series of edge candidate points is acquired, and a plurality of candidate lines including the acquired series of edge candidate points as the right and left contours is extracted.

Then, for each of the plurality of candidate lines, the degree of having characteristics of a boundary (white line) that defines a lane is calculated at each of the edge candidate points, and the candidate line with the greatest degree is detected as a white line that defines the lane.

In the present embodiment, the traveling assist process means a steering process. Specifically, when the vehicle traveling on a road is in danger of crossing the road-edge-side white line (hereinafter referred to as an outer line) of the lane closest to the road edge (e.g., curbs and guardrails) of the road, the traveling direction of the vehicle is controlled in a direction of causing the vehicle to move back into the lane. Therefore, the vehicle is equipped with the electric power steering 12 as a safety device that is driven by a steering command from the detection ECU 10. The detection ECU 10 and the electric power steering 12 correspond to an assist implementation unit.

The electric power steering 12 includes a steering 12b for changing the steering angle of the driving wheels 20 of the vehicle and a steering electric motor (corresponding to a motor) 12a. The steering electric motor 12a generates steering force (torque) that supplements the force for operating the steering 12b. The steering angle of the driving wheels 20 increases as the torque increases.

Conventionally, a determination line is provided inside the lane in the vicinity of the outer line. If the vehicle crosses the determination line, it is determined that the vehicle is in danger of crossing the outer line toward the road edge, and a predetermined traveling assist process is performed.

However, some public roads have wide shoulder widths whereas others have narrow shoulder widths. Suppose, on a road having a wide shoulder width, for example, a driver intentionally drives his/her vehicle toward the outer line in consideration of the wide width of the shoulder. In such a situation, the conventional technique could implement some traveling assistance in response to the vehicle crossing the determination line toward the road edge. In other words, traveling assistance is implemented for the movement of the vehicle that the driver has intended, causing concern that the driver may feel a sense of discomfort from the implemented traveling assistance.

In order to deal with this problem, the detection ECU 10 according to the present embodiment detects, from an image captured by the imaging device 11, the outer line that defines the lane and the road edge of the road (lateral road surface edge). The outer line that defines the lane and the road edge of the road can be detected using a method similar to the method of detecting a white line that defines a lane, which is not described in detail here. Within the area including the lane closest to the detected road edge and extending to the road edge, a forbidden position over which the vehicle is forbidden from going toward the road edge is provided. At this time, the width from the road-edge-side edge of the outer line (lateral edge of the road-edge-side of the outer line) to the road edge is calculated as a shoulder width, and the forbidden position is variably set in accordance with the calculated shoulder width.

Figure 2:
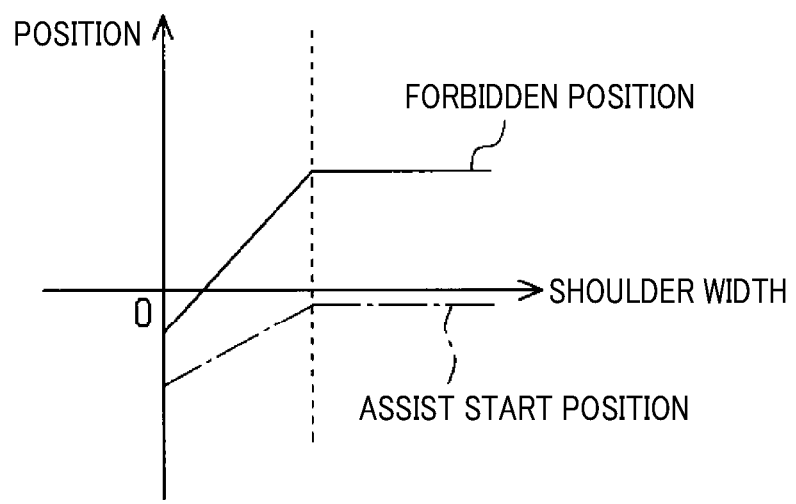
FIG. 2 is a graph illustrating the relation between shoulder widths and forbidden positions to be set.

More specifically, as depicted in FIG. 2, the forbidden position is set closer to the road edge in proportion to the shoulder width. In the graph depicted in FIG. 2, the position where the outer line is located is represented by zero, and the area between the outer line and the road edge and the area inside the lane proximate to the road edge (area between the outer line and the center of the lane) are respectively represented by positive and negative values. If a shoulder width of zero is actually detected or if no outer line is detected, the shoulder width is regarded as zero. In either of these cases, the forbidden position is provided inside the lane proximate to the road edge. That is, the forbidden position is provided between the vehicle and the outer line proximate to the road edge. In a case where the forbidden position is provided between the outer line and the road edge, an upper limit is set on the distance from the forbidden position to the outer line. The forbidden position is set in such a manner that the forbidden position is never provided on the road-edge side over the upper limit.

In the present embodiment, an assist start position is provided inside the provided forbidden position within the lane closest to the road edge. As depicted in FIG. 2, the assist start position is provided closer to the outer line in proportion to the shoulder width, as in the case of the forbidden position. However, since the assist start position is provided within the lane closest to the road edge, the assist start position is never provided between the outer line and the road edge. The area in which the assist start position can be set is narrower than that for the forbidden position. Therefore, the narrower the shoulder width is, the narrower the width between the forbidden position and the assist start position is set.

In the event that the vehicle moves toward the road edge over the assist start position set in this manner, traveling assistance by the electric power steering 12 is implemented to prevent the vehicle from moving toward the road edge over the forbidden position.

In the present embodiment, the narrower the shoulder width is, the stronger the torque of the steering electric motor 12a is made in traveling assistance. As described above, the narrower the shoulder width is, the narrower the width between the forbidden position and the assist start position is set. Therefore, if the vehicle moves toward the outer line over the assist start position on a road with a narrow shoulder width, only a short distance is left between the vehicle and the forbidden position, and thus the traveling direction of the vehicle needs to be immediately changed. Thus, the narrower the shoulder width is, the stronger the output from the steering electric motor 12a is made in traveling assistance, which can prevent the vehicle from moving toward the road edge over the forbidden position.

Figure 3:
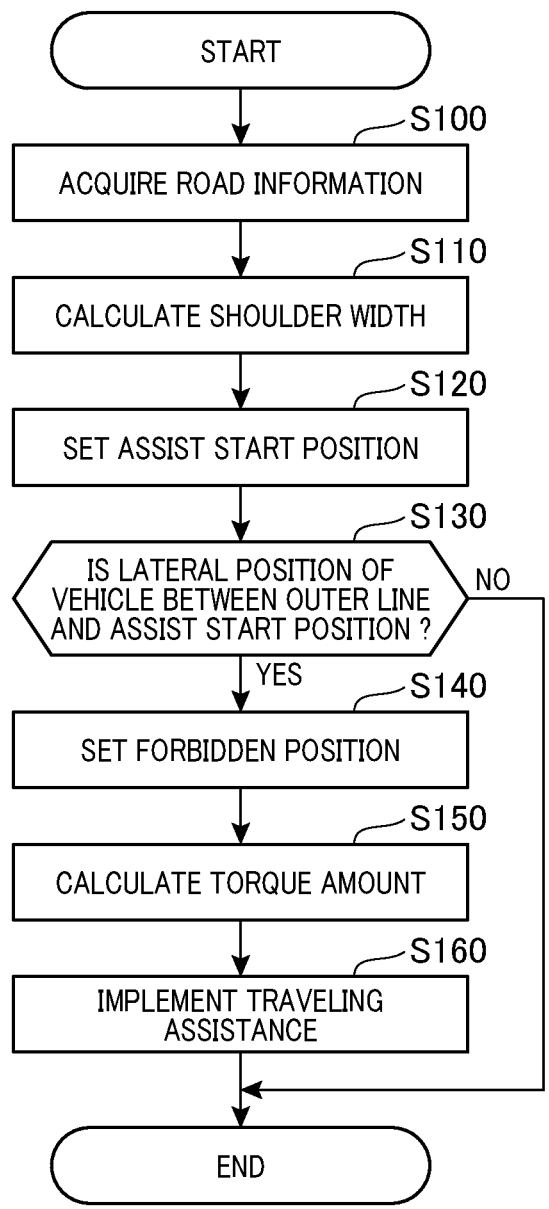
FIG. 3 is a control flowchart that is performed by a detection ECU according to the present embodiment.

In the present embodiment, departure avoidance control is performed by the detection ECU 10 as described below with reference to FIG. 3. The departure avoidance control illustrated in FIG. 3 is repeatedly performed by the detection ECU 10 at predetermined intervals while the detection ECU 10 is on.

First, in step S100, information on the positions of an outer line and a road edge is acquired from an image captured by the imaging device 11. Then, in step S110, the width from the outer line to the road edge is calculated as a shoulder width. In step S120, an assist start position is set within the lane closest to the road edge on the basis of the calculated shoulder width.

In step S130, the relative position (lateral position) of the vehicle relative to the outer line is calculated from the image captured by the imaging device 11. Then, it is determined whether the calculated lateral position of the vehicle relative to the outer line is between the outer line and the lateral position of the assist start position relative to the outer line. If the calculated lateral position of the vehicle relative to the outer line is between the outer line and the lateral position of the assist start position relative to the outer line (S130: YES), the process proceeds to step S140.

In step S140, a forbidden position is set between the road edge and the assist start position on the basis of the shoulder width calculated in step S110. In step S150, the vehicle's course changing pattern that should be applied to prevent the vehicle from moving toward the road edge over the forbidden position is calculated, and the torque that the steering electric motor 12a should output for applying the calculated course changing pattern is calculated. In step S160, the calculated torque is output by the steering electric motor 12a, and the steering angle of the driving wheels 20 is changed via the steering 12b in accordance with the torque output by the steering electric motor 12a, whereby the vehicle's course is changed.

If the calculated lateral position of the vehicle relative to the outer line is not between the outer line and the lateral position of the assist start position relative to the outer line (S130: NO), the process is finished accordingly. That is, if the lateral position of the vehicle relative to the outer line is further inside the lane closest to the road edge than the lateral position of the assist start position relative to the outer line, the process is finished accordingly.

With the above configuration, the present embodiment achieves the following effects.

Within the area including the lane closest to the road edge and extending to the road edge, the forbidden position over which the vehicle is forbidden from going toward the road edge is provided, and traveling assistance is implemented such that the vehicle does not go over the provided forbidden position. At this time, the wider the shoulder width is, the closer the forbidden position is set to the road edge. Therefore, the forbidden position on a road with a wide shoulder width is set close to the road edge due to the wide shoulder width. Thus, even when a driver drives his/her vehicle on this road toward the outer line in consideration of the wide width of the shoulder, implementation of traveling assistance by the electric power steering 12 which ignores the driver's intention can be prevented.

The shoulder width calculated when no outer line is recognized is zero since there is no shoulder. Consequently, the forbidden position is set inside the lane closest to the road edge, enabling traveling assistance by the electric power steering 12 to be implemented early.

In a case where the forbidden position is provided between the outer line and the road edge, an upper limit is set on the distance from the provided forbidden position to the outer line. Consequently, an upper limit can be set on the amount of departure of the vehicle that crosses the outer line toward the road edge, which can prevent the vehicle from significantly moving out of the lane.

The assist start position is provided further inside the lane closest to the road edge than the forbidden position. That is, the assist start position is closer to the center of the lane closest to the road edge than the forbidden position. Then, traveling assistance by the electric power steering 12 is implemented in the event that the vehicle moves toward the road edge over the provided assist start position. The wider the shoulder width is, the closer the assist start position is set to the outer line. Therefore, if the shoulder width is wide, the timing of starting traveling assistance by the electric power steering 12 can be delayed.

The above embodiment can be changed and implemented in the following manner.

In the above embodiment, the road edge of a road is detected from information in an image captured by the imaging device 11. Alternatively, a radar device may be provided to detect guardrails and curbs as the road edge of a road on the basis of information in reflected probe waves.

In the above embodiment, the width from the road-edge-side edge of the outer line to the road edge is calculated as a shoulder width. Alternatively, the width from the center of the outer line to the road edge may be calculated as a shoulder width, or the width from the lane-side end of the outer line to the road edge may be calculated as a shoulder width.

In the above embodiment, traveling assistance by the electric power steering 12 is implemented in the event that the vehicle moves toward the road edge over the assist start position. However, the electric power steering 12 need not necessarily be provided. Alternatively, for example, a brake unit may be provided to apply braking force individually to each of the driving wheels 20 of the vehicle. With such a configuration, in the event that the vehicle moves toward the road edge over the assist start position, braking force is individually given to each of the driving wheels 20 of the vehicle such that the vehicle does not move toward the road edge over the forbidden position, whereby the course direction of the vehicle is controlled. Effects similar to those of the above embodiment can also be achieved with this configuration.

In the above embodiment, the assist start position is variably set in accordance with the shoulder width. However, the assist start position may be fixed. Alternatively, the lateral velocity of the vehicle that approaches the outer line may be calculated in the lateral direction orthogonal to the traveling direction of the vehicle. The higher the calculated lateral velocity is, the further inside the lane closest to the road edge the assist start position may be set. Still alternatively, the assist start position may be variably set in accordance with the lateral velocity of the vehicle and the shoulder width.

Below is a detailed method of calculating the lateral velocity of the vehicle. In an image captured by the imaging device 11, a yaw angle, i.e., the slope of the outer line (or the road edge) to the traveling direction of the vehicle, is detected. The product of the sine value of the detected yaw angle and the traveling velocity of the vehicle is equivalent to the lateral velocity of the vehicle.

In the above embodiment, in a case where the forbidden position is provided between the outer line and the road edge, an upper limit is set on the distance from the forbidden position to the outer line. However, an upper limit need not necessarily be provided. The wider the shoulder is, the closer the forbidden position may be set to the road edge with no upper limit.

In the above embodiment, the forbidden position and the assist start position are provided, and traveling assistance by the electric power steering 12 is implemented on the basis of the forbidden position and the assist start position. Alternatively, a plurality of shoulder widths of a road on which the vehicle is estimated to travel is calculated in the traveling direction of the vehicle from information in an image captured by the imaging device 11, and a plurality of forbidden positions and a plurality of assist start positions are set on the basis of the respective shoulder widths calculated. Then, the plurality of set forbidden positions is connected by a line to form a forbidden line. Similarly, the plurality of set assist start positions is connected by a line to form an assist start line. On the basis of the forbidden line and the assist start line formed in this manner, traveling assistance by the electric power steering 12 may be implemented.

In the above embodiment, the forbidden position is set closer to the road edge in proportion to the shoulder width. Alternatively, for example, the wider the shoulder width is, the closer the forbidden position may be set to the road edge in a stepwise manner. Still alternatively, the wider the shoulder width is, the closer the forbidden position may be set to the road edge in a quadratic functional manner, or the wider the shoulder width is, the closer the forbidden position may be set to the road edge in a logarithmic functional manner.

In the above embodiment, the forbidden position is provided, and the traveling assist process is performed when the vehicle is in danger of moving toward the road edge over the forbidden position. However, the forbidden position need not necessarily be provided. The departure avoidance control may be performed simply on the basis of the assist start position. With such a configuration, in the event that the vehicle moves toward the road edge over the assist start position, traveling assistance by the electric power steering 12 is implemented such that the vehicle moves back into the lane over the assist start position.

Figure 4:
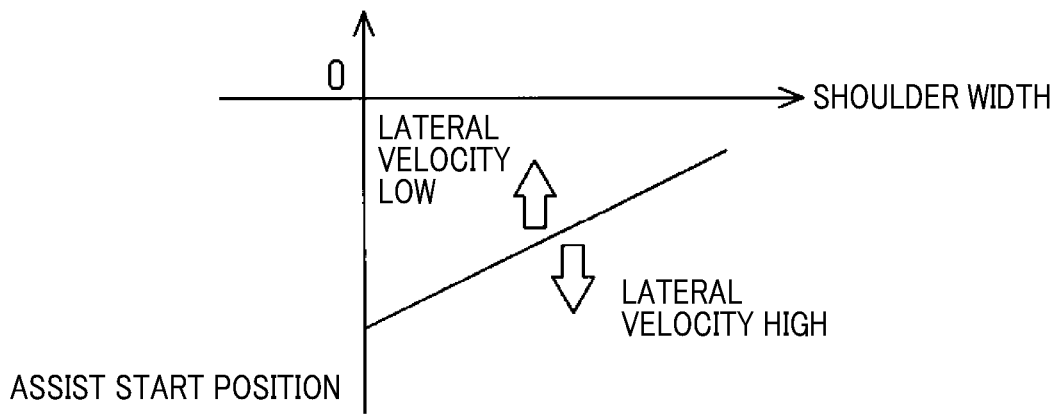
FIG. 4 is a graph illustrating the relation between shoulder widths and assist start positions to be set.

In this alternative example, as depicted in FIG. 4, the assist start position is variably set in accordance with the shoulder width and the lateral velocity of the vehicle. As in the case of the graph depicted in FIG. 2, the graph depicted in FIG. 4 indicates that forbidden positions with negative values are located inside the lane proximate to the road edge and forbidden positions with positive values are located between the outer line and the road edge, with the position where the outer line is located represented by zero. Therefore, the assist start position is set closer to the outer line in proportion to the shoulder width, and set further inside the lane proximate to the road edge as the lateral velocity of the vehicle increases. However, although not illustrated in FIG. 4, the assist start position has an upper limit since it is provided inside the lane proximate to the road edge. Therefore, the assist start position is set in such a manner that the assist start position is never provided between the outer line and the road edge.

The functions and effects similar to those of the above embodiment can be achieved with such configurations.

The present disclosure has been described with reference to examples, but it is to be understood that the present disclosure is not limited to the examples and structures. The present disclosure covers various modifications and equivalent variations. In addition to various combinations and forms, other combinations and forms including one or more/less elements thereof are also within the spirit and scope of the present disclosure.

The invention claimed is:
1. A lane departure avoidance system comprising:
   an in-vehicle camera that captures an image of a road ahead of a vehicle;
   a road edge recognition unit that recognizes a road edge of the road from the image captured by the in-vehicle camera;

an outer line recognition unit that recognizes, from the image captured by the in-vehicle camera, an outer line as a dividing line drawn on a road-edge side of a lane closest to the road edge; and an assist implementation unit that provides, within an area including the lane closest to the road edge and extending to the road edge, a forbidden position over which the vehicle is forbidden from going toward the road edge, and implements traveling assistance such that the vehicle does not go over the forbidden position, wherein the vehicle includes an electric power steering that controls a traveling direction of the vehicle in accordance with output from a motor, the traveling assistance is implemented, controlling the traveling direction of the vehicle in a direction that causes the vehicle to move back into the lane using the electric power steering, the lane departure avoidance system includes a shoulder width calculation unit that calculates, as a shoulder width, a width from the outer line recognized by the outer line recognition unit to the road edge recognized by the road edge recognition unit, the wider the shoulder width calculated by the shoulder width calculation unit is, the closer the forbidden position is set to the road edge by the assist implementation unit, and an output from the motor is calculated based on the forbidden position such that the narrower the shoulder width calculated by the shoulder width calculation unit is, the stronger the output from the motor is made by the assist implementation unit in the traveling assistance.

2. The lane departure avoidance system according to claim 1, wherein
when the outer line is not recognized by the outer line recognition unit, the shoulder width calculation unit calculates that the shoulder width is zero.

3. The lane departure avoidance system according to claim 1, wherein
when the shoulder width calculation unit calculates that the shoulder width is zero, the assist implementation unit provides the forbidden position inside the lane closest to the road edge.

4. The lane departure avoidance system according to claim 1, wherein
in a case where the forbidden position is provided between the outer line and the road edge, the assist implementation unit sets an upper limit on a distance from the forbidden position to the outer line.

5. The lane departure avoidance system according to claim 1, comprising
a lateral velocity calculation unit that calculates a lateral velocity of the vehicle that approaches the outer line in a lateral direction orthogonal to the traveling direction of the vehicle, wherein
the assist implementation unit provides an assist start position further inside the lane closest to the road edge than the forbidden position, and implements the traveling assistance when the vehicle moves toward the road edge over the assist start position, and the higher the lateral velocity calculated by the lateral velocity calculation unit is, the further inside the lane closest to the road edge the assist start position is set by the assist implementation unit.

6. The lane departure avoidance system according to claim 1, wherein
the assist implementation unit provides the assist start position further inside the lane closest to the road edge than the forbidden position, and implements the traveling assistance when the vehicle moves toward the road edge over the assist start position, and the wider the shoulder width calculated by the shoulder width calculation unit is, the closer the assist start position, which is provided further inside the lane closest to the road edge than the forbidden position, is set to the outer line by the assist implementation unit.

7. A lane departure avoidance system comprising:
an in-vehicle camera that captures an image of a road ahead of a vehicles;
a road edge recognition unit that recognizes a road edge of the road from the image captured by the in-vehicle camera;
an outer line recognition unit that recognizes, from the image captured by the in-vehicle camera, an outer line as a dividing line drawn on a road-edge side of a lane closest to the road edge; and
an assist implementation unit that provides an assist start position inside the lane, and when the vehicle moves toward the outer line over the assist start position, implements traveling assistance such that the vehicle moves back into the lane over the assist start position, wherein the vehicle includes an electric power steering that controls a traveling direction of the vehicle in accordance with output from a motor, the traveling assistance is implemented, controlling the traveling direction of the vehicle in a direction that causes the vehicle to move back into the lane using the electric power steering, the lane departure avoidance system includes a shoulder width calculation unit that calculates, as a shoulder width, a width from the outer line recognized by the outer line recognition unit to the road edge recognized by the road edge recognition unit, the wider the shoulder width calculated by the shoulder width calculation unit is, the closer the assist start position is set to the outer line by the assist implementation unit, and an output from the motor is calculated based on the assist start position relative such that the narrower the shoulder width calculated by the shoulder width calculation unit is, the stronger the output from the motor is made by the assist implementation unit in the traveling assistance.

* * * * *